United States Patent [19]
Tokugawa

[11] Patent Number: 4,909,540
[45] Date of Patent: Mar. 20, 1990

[54] ADJUSTABLE ANCHOR DEVICE
[75] Inventor: Osamu Tokugawa, Fujisawa, Japan
[73] Assignee: Nippon Seiko Kabushiki Kaisha, Tokyo, Japan
[21] Appl. No.: 263,649
[22] Filed: Oct. 27, 1988
[30] Foreign Application Priority Data Nov. 11, 1987 [JP] Japan ............................ 62-171274[U]

[51] Int. Cl.$^4$ ............................................. B60R 22/00
[52] U.S. Cl. ..................................... 280/808; 280/804
[58] Field of Search ................................ 280/804, 808

[56] References Cited
U.S. PATENT DOCUMENTS 4,579,368  4/1986  Kawade et al. ...................... 280/808
4,640,550  2/1987  Hakansson .......................... 280/808

FOREIGN PATENT DOCUMENTS 2176091A  12/1986  United Kingdom .

Primary Examiner—Kenneth R. Rice
Attorney, Agent, or Firm—Hedman, Gibson, Costigan & Hoare

[57] ABSTRACT

An adjustable anchor device comprises an elongated adjustment base, an adjustable anchor formed in a C shape cross-section and having a pair of opposing arms to enclose the adjustment base, an anchor member fixed to the adjustable anchor for supporting a shoulder belt, a lock member adapted to be engaged with an engaging opening on the adjustment base, and an interlocking means provided on the adjustable anchor for preventing said opposing arms from separating from each other.

17 Claims, 2 Drawing Sheets

ADJUSTABLE ANCHOR DEVICE

FIELD OF THE INVENTION

This invention relates to an adjustable anchor device, particularly to an adjustable shoulder anchor device for a shoulder belt which restrains the upper body of a rider in a vehicle.

BACKGROUND OF THE INVENTION

In conventional seat belt devices such as the three point seat belt devices which are used in vehicles, a shoulder anchor device is used in order to make it possible for the seat belt to fit passengers of different bodily builds, who assume different postures while driving. The shoulder anchor device makes it possible to adjust the support or attachment position where the shoulder belt for restraining the upper body is attached to the vehicle on the shoulder side. Normally the support or attachment position is adjusted vertically, so that the support position of the shoulder belt is prevented from being moved or shifted in, for example, a vehicle collision.

In FIGS. 1 to 3 which show this kind of conventional anchor device, an adjustment base 1 is fixed to, for example, a center pillar of the vehicle body (not shown) in its longitudinal direction (up-down direction of the vehicle body). An adjustable anchor 2 is attached to the adjustment base 1 so that is can move in the vehicle's up-down direction. The adjustable anchor or runner 2 cannot move in the longitudinal direction of the adjustment base or guiding member 1 when the lock pin 3 is mated with one of the engaging openings 6 which are provided at specified intervals in that direction; when the pin is pulled out from the hole, it can move. Fixed to the adjustable anchor 2 through some means such as coupling is a through-anchor 4 through which a shoulder belt 5 passes.

It is known that the input load applied to the shoulder belt 5 can reach as much as two tons during a vehicle collision. For this reason, in order to insure that the shoulder belt will be strong enough to perform reliably in such an emergency, the anchor device must be sufficiently strong in the input transmission path to the vehicle side. This is one of the most important design requirements.

Now, the construction of conventional anchor devices, particularly the adjustable anchor 2 is explained with reference to the transmission of the shock force.

A shock is input from the shoulder belt 5 through the through-anchor 4 in the X or X' direction in FIG. 1, transmitted to the adjustable anchor 2, and then through the lock pin 3 to the adjustment base 1. Consequently, since an anchor bolt 8 is used in order that the adjustable anchor 2 is securely coupled to the through-anchor 4 through which the shoulder belt 5 passes, it is necessary for the attachment strength of the anchor bolt 8 to be maintained sufficiently strong to resist the shock. The strength of the attachment of the lock pin 3 to the adjustable anchor 2 also must be adequate in order for the load to be transmitted to the adjustment base 1 without difficulty.

In addition, the construction or strength of the adjustable anchor 2 must be focused. Supposing that the adjustable anchor 2 becomes deformed, the lock pin 3 will be displaced relative to the adjustment base 1 and the pin will be released from its coupling to the adjustment base 1, resulting in that the effectiveness of restraint of the passenger is greatly reduced or lost in the adjustable anchor device. Therefore, it is important for both the strength of the adjustable anchor 2 itself and the coupling of the lock pin 3 to the adjustable anchor 2 to be adequate.

In order to meet these requirements, and make it easy to adjust the position of the adjustable anchor 2, the adjustable anchor 2 in an improvement has opposing arms 2a and 2b on its rear side to form a square C shape in cross section which can maintain a cross-sectional area enough to keep the attachment strength, as shown in FIG. 3. Using this shape, the through anchor 4 is fastened by the anchor bolt 8, and the design permits the lock pin 3 to be supported by the upper and lower side portions of the C-shaped adjustable anchor 2. Then by moving the lock pin 3 from the upper side portion to the lower one or form the lower side portion to the upper one, the lock pin 3 becomes coupled to or decoupled from the engaging opening 6 of the adjustment base 1. Accordingly, the C-shaped adjustable anchor 2 can move along the adjustment base 1, in the vertical or up-down direction relative to the vehicle, with its inner surfaces sliding on the adjustment base 1. Thus the movement of the C-shaped adjustable anchor 2 can be made only when the lock pin 3 is decoupled from the adjustment base 1.

However, when the space inside the vehicle cabin is limited, it can become impossible for the adjustable anchor 2 to have the necessary cross-sectional area. Accordingly, some measures must be taken to compensate for; for example, increasing the plate thickness of the adjustable anchor 2, using stronger material for the adjustable anchor 2, using induction hardening to increase the surface hardness of the section of the adjustable anchor 2 to which the lock pin 3 is coupled, or forming the adjustable anchor 2 in a closed square shape. All of these measures increase weight and/or cost.

The purpose of this invention is to solve these problems and to provide a more highly reliable adjustable anchor device without sacrificing vehicle space.

SUMMARY OF THE INVENTION

The adjustable anchor device of this invention comprises an adjustment base having a plurality of engaging openings; an adjustable anchor which can move along the long direction of the adjustment base; an anchor member fixed to the adjustable anchor to support a belt that restrains the passenger; a lock member which moves while supported by the adjustable anchor and fixes the adjustable anchor to a specified position on the adjustment base by mating to one of the engaging openings; and the adjustable anchor made in a semi-open or C shape in cross-section to enclose the adjustment base and provided with on the open side an interlocking means of preventing the adjustable anchor from expanding out.

Even when a device having the construction is subjected to a large shock input, as for example during a vehicle collision, adequate strength of the adjustable anchor is maintained due to the interlocking means for preventing the adjustable anchor from being deformed, so that the lock pin is not displaced relative to the adjustment base. There is no problem such that the adjustable anchor does suddenly become uncoupled.

SIMPLE DESCRIPTION OF THE DRAWINGS

DESCRIPTION OF THE PREFERRED EMBODIMENTS

Figure 1:
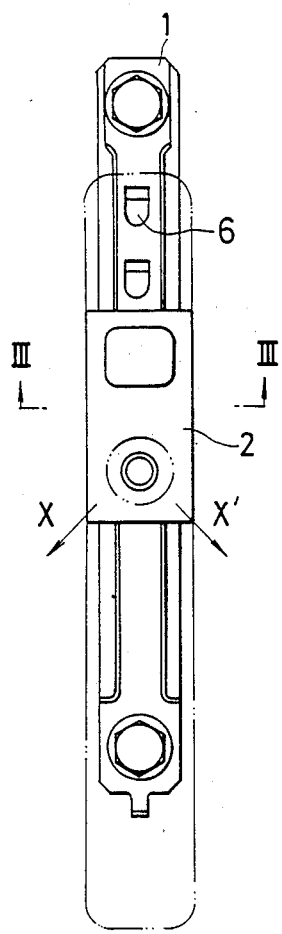
FIG. 1 is a front elevational view of a conventional adjustable anchor device.
Figure 2:
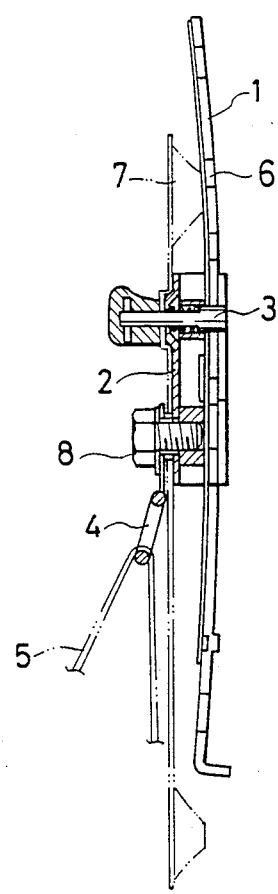
FIG. 2 is a cross-sectional view of the adjustable anchor device in FIG. 1.

An adjustable shoulder anchor device utilizing the present invention will now be explained using the embodiments shown in the drawings, in which like reference numerals are used to indicate like members throughout the drawings.

Figure 3:
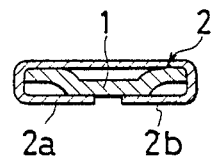
FIG. 3 is a cross-sectional view taken along the line III—III in FIG. 1.
Figure 4:
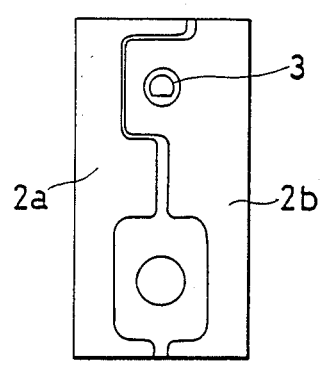
FIG. 4 is a rear view of the adjustable anchor in the conventional adjustable anchor device in FIG. 1.
Figure 5:
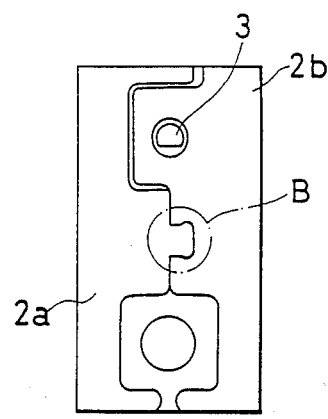
FIG. 5 is a rear elevational view of an adjustable anchor which shows a first embodiment of an adjustable anchor device in the present invention.
Figure 6:
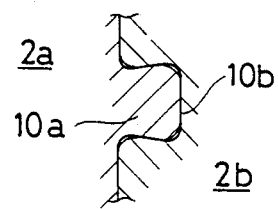
FIG. 6 is an enlarged view which shows section B of FIG. 5 in greater detail.

FIG. 5 shows a first embodiment of this invention, and FIG. 6 shows details of section B in FIG. 5. The adjustable anchor 2 is formed in a C-shape in cross-section, and has opposing arms 2a and 2b which extend inwardly from the lateral sides in a similar manner to that of FIG. 3, but the arms 2a and 2b of the C-shaped anchor are coupled to each other in its center section through an interlocking construction. Specifically, the arm 2a has a convex portion or projection 10a, while the arm 2b has a concave portion or recess 10b to receive the convex portion or projection 10a in a nest shape. The convex portion or projection 10a is made divergent toward the concave portion or recess 10b. Since the arms 2a and 2b of the adjustable anchor 2 is thus coupled to form a box-like structure, then even if a large shock input, such as that received during a vehicle collision, is received in the X or X' direction as in FIG. 1, the stress or tension can be efficiently dissipated, so that the convex portion or projection 10a could not be pulled out from the concave portion or recess 10b even under a high tension upon collision. In other words, since the arms 2a and 2b of the adjustable anchor 2 in the open or C cross-section shape is not expanded or separated from each other, the circumference of the lock pin 3 is not deformed under such a high tension.

Figure 7:
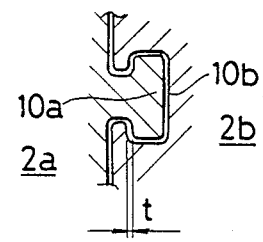
FIG. 7 and FIG. 8 are enlarged views similar to FIG. 6 showing which are second and third embodiments of this invention.
Figure 8:
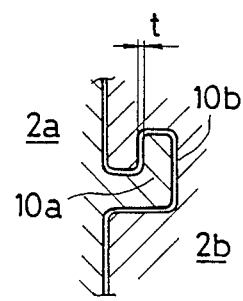

In FIG. 7 and FIG. 8 which show the second and third embodiments, the only difference from the first embodiment is the shape of the interlocking means comprising the convex portion or projection 10a and the concave portion or recess 10b. Specifically, the convex portion or projection 10a in the second embodiment has a T-shape with the complementary shape in the concave portion or recess 10b, and the convex portion or projection 10a in the third embodiment has a L-shape with the complementary shape in the concave portion or recess 10b, wherein the lower portion of the T-shaped projection 10a is connected to the arm 2a, and the lower portion of the L-shaped projection 10a is embedded in the arm 2b. These shapes also are formed to be against the force which is inclined to separate the convex portion or projection 10a and the concave portion or recess 10b from each other. In the second and third embodiments, there is a clearance t in the interlocking means; this can be made to have a very small value by careful control of the precision of machining and assembly of the adjustable anchor 2. The device functions in the same way as in the first embodiment.

Figure 9:
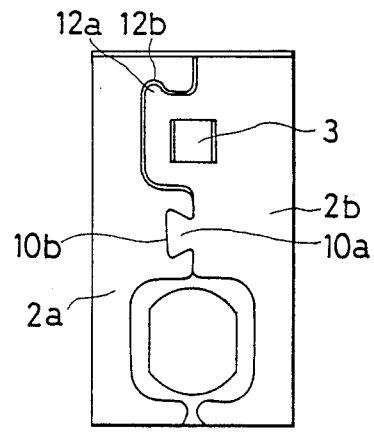
FIG. 9 is a rear elevational view of an adjustable anchor device which shows a fourth embodiment of this invention.

FIG. 9 shows a fourth embodiment of the subject invention, which further has an interlocking structure provided at the upper corner of the convex section near the hole for receiving the lock pin 3. Specifically, a convex portion or projection 12a is provided at the upper corner of the convex section in the arm 2b, while a concave portion or recess 10b in the complementary shape provided in the arm 2a. Since the convex portion or projection 12a is projected in a direction orthogonal to the separating force between the arms 2a and 2b, the convex portion or projection 12a in a simple shape can be against the separating force. This also helps to prevent the rear side of the adjustable anchor 2 from opening at the corner near the lock pin 3. It will be noted that there are a pair of retaining structures 12a, 12b and 10a, 10b above and below the lock pin 3 in this embodiment. Consequently, the lock pin is pivotably secured to the adjustment base 1 at a predetermined position.

In the configuration described above, a highly reliable adjustable anchor device is obtained at low weight and low cost, with efficient use of space. In particular, it is not necessary to use a special material such as high tension steel plate; at the same time the member plate thickness can be made thin and it becomes unnecessary to apply heat treatment or other special treatment.

Other modifications could be made possible for those skilled in the art within the scope of the present invention.

What is claimed is:

1. An adjustable anchor device comprising an adjustment base which has a plurality of engaging openings, an adjustable anchor having a closed side and an opposed side having a C shape cross-section said adjustable anchor mounted about and thereby substantially enclosing a portion of said adjustment base and being movable along said adjustment base, an anchor member fixed to said adjustable anchor for supporting a shoulder belt, a lock member supported by said adjustable anchor and adapted to be engaged with one of said plurality of engaging openings to fix said adjustable anchor to said adjustment anchor for preventing said open side of said adjustable and from expanding out of said C shape cross-section.

2. The anchor device as described in claim 1, wherein said means for preventing said open side of said adjustable anchor from expanding out of said C shape cross-section comprises an interlocking means.

3. The anchor device as described in claim 1, wherein said means for preventing said open side of said adjustable anchor from expanding out of said C shape cross-section is provided in an almost mid portion between a position where said anchor member is fixed and a position where said lock member is supported.

4. The anchor device as described in claim 2, wherein said interlocking means is provided in an almost mid portion between a position where said anchor member is fixed and a position where said lock member is supported.

5. The adjustable anchor device as described in claim 2, wherein said interlocking means comprises a convex portion and a concave portion formed in said open side, said concave portion adapted to receive said convex portion in nesting relationship to thereby resist expanding out of said C shape cross-section.

6. The adjustable anchor device as described in claim 5, wherein said convex portion is formed divergent toward said concave portion while said concave portion is formed in a complementary shape.

7. The adjustable anchor device as described in claim 5, wherein said convex portion is formed in a L shape and said concave portion is formed in a complementary shape, wherein said L shape convex portion is positioned in a direction so as to resist expanding out of said C shape cross-section.

8. The adjustable anchor device as described in claim 5, wherein said convex portion is formed in a T shape and said concave portion is formed in a complementary shape, wherein said T-shape convex portion is positioned in a direction so as to resist expanding out of said C shape cross-section.

9. The adjustable anchor as described in claim 1, wherein the adjustable anchor comprises a wall portion adapted to support the lock member on the open side and on the closed side of the adjustable anchor.

10. An adjustable anchor device comprising an elongated adjustment base having a plurality of engaging openings, an adjustable anchor formed in a C shape cross-section having a closed end and an open end having first and second opposing arms, said adjustable anchor mounted about and thereby substantially enclosing a portion of said adjustment base, said adjustable anchor being movable along said adjustment base, and anchor member fixed to said adjustable anchor for supporting a shoulder belt, a lock member supported by said adjustable anchor and adapted to be engaged with one of said plurality of engaging openings to securely mount said adjustable anchor to said adjustment base, and an interlocking means provided on said adjustable anchor for preventing said opposing arms from separating from each other.

11. The adjustable anchor device as described in claim 10, wherein said interlocking means comprises a convex portion formed in said first arm, and a concave portion formed in said second arm and adapted to receive said convex portion in a nesting relationship to thereby resist separation of said arms.

12. The adjustable anchor device as described in claim 11, wherein said convex portion is formed divergent toward said concave portion while said concave portion is formed in a complementary shape.

13. The adjustable anchor device as described in claim 11, wherein said convex portion is formed in a L shape while said concave portion is formed in a complementary shape, wherein the lower portion of said L shape convex portion is embedded in said second arm so as to be against a separating force exerting on said arms.

14. The adjustable anchor device as described in claim 11, wherein said convex portion is formed in a T shape while said concave portion is formed in a complementary shape, wherein the lower portion of said T shape convex portion is connected to said first arm so as to be resistant against a separating force exerting on said arms.

15. The adjustable anchor device as described in claim 10, wherein said interlocking means is provided on at least one side of said lock member.

16. The adjustable anchor device as described in claim 15, wherein a first interlocking means on one side of said lock member comprises a convex portion formed in said first arm and projecting in a direction orthogonal to a line through which an applied force can separate said arms, and a concave portion formed in said second arm adapted to receive said convex portion in nesting relationship to thereby resist said separating force, and a second interlocking means on the other side of said lock member comprises a convex portion formed in said second arm and formed divergent toward said first arm, and a concave portion formed in said first arm and formed in a complementary shape to receive said convex portion in nesting relationship to thereby resist said separating force.

17. The adjustable anchor device as described in claim 10, wherein the adjustable anchor comprises wall portion adapted to support the lock member on the open side and on the closed side of the adjustable anchor.

* * * * *